May 13, 1969  YOSHIO MATSUDA ET AL  3,443,305

METHOD OF MANUFACTURING A COMPOSITE METALLIC WIRE

Filed April 15, 1965

INVENTORS
YOSHIO MATSUDA AND
SHIGENOBU OZAKI
BY WILLIAM D. CAROTHERS
THEIR ATTORNEY

United States Patent Office 3,443,305
Patented May 13, 1969

3,443,305
METHOD OF MANUFACTURING A COMPOSITE METALLIC WIRE
Yoshio Matsuda and Shigenobu Ozaki, Itami-shi, Japan, assignors to Sumitomo Electric Industries, Ltd., Higashi-ku, Osaka, Japan, a company of Japan
Filed Apr. 15, 1965, Ser. No. 448,411
Claims priority, application Japan, Apr. 25, 1964, 39/23,483
Int. Cl. B23k 31/06, 31/02, 1/20
U.S. Cl. 29—474.1                    10 Claims

ABSTRACT OF THE DISCLOSURE

Manufacturing a metallic composite wire wherein a core wire is covered with an outer cladding material in the original form of a continuous tape having a resistance to deformation less than that of the core wire, continuously formed circumferentially around the core wire to produce a composite wire. The composite wire thereafter is heated with a temperature difference established within a requisite range being maintained between the outer cladding tape and the inner core wire. The heated composite wire is then subjected to pressure bonding to uniformly bond the heated cladding material to the entire core wire surface with excess cladding material produced during the pressure bonding process being severed and shaved off of the composite wire to produce a concentric circular composite wire.

---

The present invention relates to a method of manufacturing composite metal wires consisting of steel wire or the like cladded with a metal covering of aluminum or other metals. This invention furnishes an economical method of manufacturing a composite metal wire without degrading the properties of the core steel wire, by attaching a metal plate in a tape form to the core metal wire to cover it or making a seamless covering by extrusion pressing and scalping the skin part after the pressure bonding process. The present method is characterized in that an excellent composite metal wire is obtained by effecting especially effective bonding between the cladding material and the core wire and at the same time making the sealing of the covering metal perfect.

Other objects and advantages appear hereinafter in the following description and claims.

Figure 1:
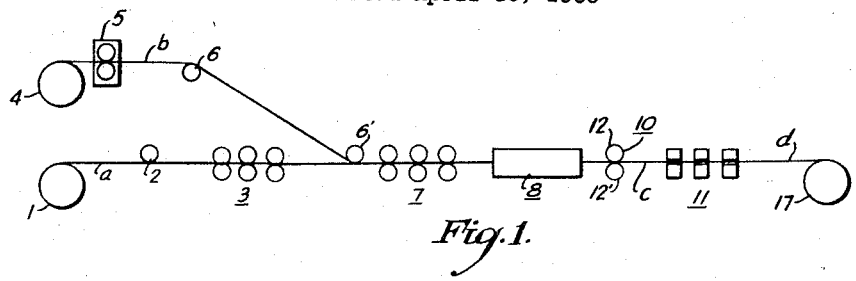
Figure 7:
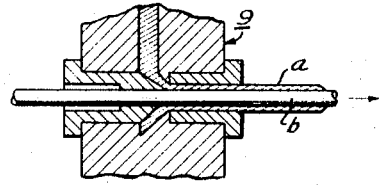
Figure 8:
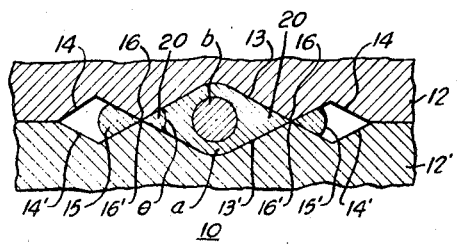
Figure 9:
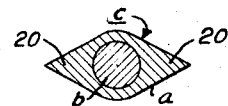
Figure 11:
Figure 10:
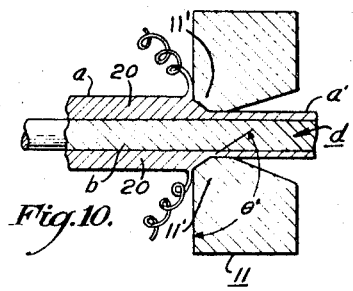
Figure 13:
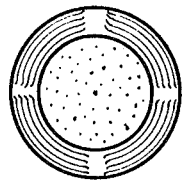
Figure 12:
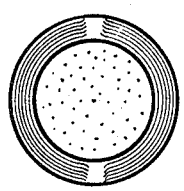

The accompanying drawings show, for the purpose of exemplification without limiting the invention or the claims thereto, certain practical embodiments illustrating the principles of this invention wherein:

FIGURE 1 is a diagrammatic view to explain an apparatus for carrying out the method of the present invention. FIGURES 2 to 6 are sectional views to show the steps of the processes for cladding the core wire. FIGURE 7 is a sectional view that shows the forming process where an extrusion press is used. FIGURE 8 is a sectional view with parts broken away that shows the process in which pressure bonding and fin removing steps are carried out simultaneously. FIGURE 9 is a sectional view of the composite body after the completion of the pressure bonding. FIGURE 10 is a sectional view that shows the process of scalping the outer skin. FIGURE 11 is a sectional view that shows a section of the completed wire. FIGURE 12 and FIGURE 13 show a view of an exposed section of the product of this invention explaining the metallographic structure.

Figure 2:
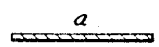
Figure 3:
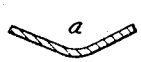
Figure 4:
Figure 5:

In explaining the invention in detail, reference to the example of its embodiment is shown in FIG. 1 of the attached drawing, in which a steel core wire is cladded with copper. The copper tape $a$ which is the cladding material is drawn out from the reel 1; has its surface cleaned by the wire brush 2; and is then formed by rows of forming rollers 3 gradually into a U-shape as shown in FIGURES 2-4. On the other hand, the core $b$ material, plated or not plated, drawn out from the bobbin 4 has its entire surface cleaned and roughened, in particular, by means of shot or grit blast 5. The steel core wire $b$ led by the guide rolls 6, 6' and the afore-mentioned U-shaped tape $a$ are put together one upon the other as shown in FIGURE 5. Then the core wire $b$ is gradually encased and sealed in the tape $a$ by the rows of forming rollers 7, is then heated in the air, or in a reducing or neutral atmosphere, or in a vacuum heating chamber 8, and is pressed by the pressure rollers 10 (in FIGURE 8) so that said cladding tape $a$ and core wire $b$ are pressure bonded on their clean and rough surfaces into one body. The composite wire material $c$ (in FIGURE 9) sent out in this way is finished into a composite wire of the required dimensions having a concentric circular cross section by means of dies or a row of dies 11 which have a blade of an obtuse angle as shown in FIGURE 10. The finished wire $d$ is then taken up by the take-up drum 17.

In the above-mentioned process the pressure bonding rolls 10 are calibered rolls 12, 12' as shown in FIGURE 8, which have concavities 13, 13' approximating a diamond-shaped contour. There is provided conjugate formed cavities 14, 14' facing each other on both sides to provide room to receive flowing excessive material referred to as fins 15, 15'. As mentioned above the core wire to be cladded is passed with the cladding tape between these pressure bonding rollers 10 to deform the cladding material and at the same time to press it against the whole circumferential surface of the core wire, whereby the inner and outer metals are pressure bonded into one body at their inter-surface while the excessive material in the form of the fins 15, 15' protrudes on both sides and these fins are cut off at the same time by means of the blades 16, 16' of the calibered rolls 12, 12'. The composite wire rod $c$ having a cross section in the shape of lips 20 formed by the concavities 13, 13' is shaved of this excessive portion or lips 20 of cladding materials by means of dies or a row of dies 11 which have blades 11' of an obtuse angle, and is thus finished into a composite wire $d$ having a cross section of specified concentric circles, and is then taken up on a reeling drum 17.

Figure 6:
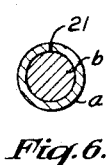

In this process, however, the cladding material has a seam 21 formed by the covering tape $a$, as shown in FIGURE 6. Unless this part is completely sealed, it may cause the thickness of the coating to become uneven during the subsequent pressure bonding process or may allow a liquid or gas to enter from outside to interfere with the pressure bonding. Consequently where it is possible to form the cladding material by extrusion press process, there will be no such seam 21 and, therefore, this process is found more favorable.

In order to form copper cladding under the extrusion press process, it is necessary to have an extrusion temperature of 800° C. This causes the steel wire core, whose surface has been cleaned, to become oxidized and contaminated again, so that a complete pressure bonding in the next process may become difficult. On the contrary, however, aluminum can be extruded at a temperature of 450° C., so that it is easier to keep and maintain the steel wire core clean.

In case of steel wire core to be cladded with aluminum, the entire surface of the core wire $b$, which has been plated or not plated, as already mentioned, is cleaned and roughened by means of shot blast or the like and is introduced into the extrusion press 9 as shown in FIGURE 7 for complete covering and sealing with aluminum, and thereafter undergoing the same subsequent processes as mentioned in the case for copper cladding to be finished into a composite wire.

In the above-mentioned manufacturing processes, what is essential to accomplish the principal object of the present invention, which is the solid phase bonding of the coating and core in one body, is the proper selection of such conditions as the necessary condition of the contact surfaces of the metals, pressure condition, deforming property of the materials, etc.

First, the contact surfaces are greatly affected by the kinds of the metals to be combined, their smoothness, cleanliness, etc. It is absolutely necessary to make the surfaces clean. As the core wire is to be sealed and cladded with the cladding material, the cleaning of the surfaces has to be done before the two materials are composited together. As methods for the cleaning of surfaces, a mechanical method using a wire brush or the like and a chemical method such as acid pickling are employed. However, in the case of steel wire, particularly high carbon steel wire, acid pickling may produce smut and may cause acid brittleness, so that it is desirable to employ a mechanical method. With the object of facilitating the mechanical cleaning of such a hard surface and of decreasing the contamination of the surface after cleaning, a method is sometimes adopted in which the steel wire is previously plated with a somewhat softer material such as copper, zinc, tin, etc. However, this method has such shortcomings that cracks may take place in the plating layer during the cleaning process and that the properties of the core wire may be deteriorated by the diffusion of the plated metal caused by a rise in temperature. Furthermore, the plating material calls for an additional step in the cleaning process and although it is effective in cleaning, it is not a desirable procedure after all. However, the plating step has, on the other hand, such advantages that wire brushing, the simplest mechanical method of cleaning, can be employed following the plating step and that the cladding can be done quite satisfactorily even after several days from the cleaning. Plating is therefore done in some cases.

Under the present invention it has been discovered that the bonding strength of interface is by far greater where the contact surfaces of the inner and outer metals have been roughened as compared with where they are both smooth. As the blasting method readily has both cleaning and roughening effects even on the surface of such a hard metal as high carbon steel, the shot blast or grit blast method is employed instead of the wire brushing method which has been found to cause much wear on high carbon steel and to be effective in producing a rough surface. The above mentioned objective is thus obtained by this very simple and economical method in which very hard particles are blown against the circumferential surface of the core wire continuously, the blasting material being used repeatedly.

The clean and rough-surfaced core wire $b$ prepared in the above-mentioned way and the tape $b$ which has been subjected to wire brush cleaning (or the said blast cleaning) are put together and immediately sent on to the rows of forming rollers 7 to form a composite sealed wire. It is then heated to a specified temperature in the heating chamber 8 and then pressure bonded, or is shaped into a seamless form by an extrusion press to have the core wire completely sealed in the cladding material and is then pressure bonded. In the case of shaping by extrusion press which is one of the essential points of the present invention, the thickness of the coating produced has a very good uniformity and the coating extruded on the core wire can be made continuously free of seams, so that a rolling lubricant may freely be used in the next process of pressure bonding without any anxiety of adverse effects, as there is no fear of a harmful liquid or gas finding its way into the coating interior. The forming operation can, therefore, be carried out at a very high efficiency and excellent products can easily be obtained therefrom.

As already mentioned, the forming by extrusion press has to be a high temperature process because of the ability of the cladding material to change its form. As for the extrusion temperature, 450° C. is high enough for the covering with aluminum shown in FIGURE 7. At a temperature about as low as this, the oxidation of the core steel wire is almost negligible, so that the operation may be conducted in the air. In the case of copper, nickel, etc., a high temperature near 1000° C. is required, so that the extrusion covering has to be done in a complete neutral atmosphere or a vacuum in order to maintain the cleanliness of the surface of the core wire.

In the present invention, the use of pressure bonding rollers in the shape of lips in the pressure bonding process is very important for the unification of the bonding force between the inner and outer metals throughout the whole circumference. If rollers with the round caliber are used, there is no bonding force developed to press the cladding material towards the core material in the direction normal to the direction of the vertical pressing force of the rolls, so that there may take place such defects that the cladding material may become separated from the core material on both sides of the core and that the core wire becomes deformed due to excessive force applying to the top and the bottom of the core in the cross section shown in FIG. 8.

If the so-called lip-shaped caliber, in which both sides gradually converge from the top and bottom central portion of the concavities 13, 13', is used as in the method of the present invention, the bonding force acts on the sides as well as the top and bottom of the core wire through the deforming of the cladding material itself by the calibered rolls 12, 12', so that a uniform bonding force acts on the entire circumference of the core and consequently an excellent composite wire rod in a uniform bonding condition around the whole circumference without any abnormal deformation of the core wire is obtained. However, it is suitably necessary to make the proper selection of the shape of the caliber rolls, especially the angle $\sigma$ of the cross-section thereof when the concavities 13, 13' are in engaged position as shown in FIG. 8 in accordance with the kind of the cladding material being utilized.

This consideration is necessary because of the influence of friction between the roll surfaces and the cladding material which flows along the core material at the time of pressure bonding. Where the deformability of the cladding material is less than that of the core material; for example, where a steel core is cladded with aluminum, it is necessary to make the angle $\sigma$ large, while it is necessary to make the angle $\sigma$ small where the deformability of the cladding material is comparatively great as compared with that of the core material; for example, where steel is cladded with copper.

According to the results of experiments, where the pressure bonding is completed by a two step pressure bonding process, it is usually advisable to make $\sigma$ larger one after the other, for example, $\sigma=60-90°$ for the first step and $\sigma=90-120°$ for the second step. Furthermore, it has been confirmed that very good results are obtained by providing a gap at the apex of the angle $\sigma$, namely between the opposed blade parts 16, 16' of the two rolls 12, 12' so that there is no contact in order to permit sufficient flow of the cladding material. It has, therefore, been decided where the caliber of the pressure bonding rolls is in the aforementioned shape of lips with cavities on both sides connected with it will lead to induce excessive flowing of the cladding material through the thin gaps between these rolls, the excessive material 15, 15' which has flowed into these parts being pinched sufficiently to be cut off by means of the blades 16, 16' on both sides of the lip caliber at the same time.

With the composite rod $c$ obtained in this way, however, only the core $b$ has a truly round cross section but the cladding material has a non-circular cross section in the shape of lips 20, as shown in FIGURE 9. It is therefore required to shave the composite wire c of the excessive portion to make it round and concentric with the core b.

Even if the outer circumference is truly round and the core is truly round, the two will not be concentric but will be eccentric, if the shaving is not done properly in this case.

According to the results of experiments carried out relative to the present invention, good results were obtained by using shaving dies which had bearing surfaces forming a blade disposed at an angle $\sigma$ being an obtuse angle as shown in FIGURE 10 and applying a back tension in addition to a shaving action.

The metallographical structure of the cross section of the composite wire after the above-described shaving is shown in FIGURES 12 and 13. The cladding material distorts and flows in the axial direction of the core and in directions normal to it and the tips or fins 15, 15' of the flows are cut off by the blades 16, 16', excessive portions or lips 20 being further shaved off to make the composite wire round. This structure, however, neither deteriorates the properties of the wire formed nor renders to it any structural orientation. If the eccentricity which takes place in the case of dies with an obtuse blade angle are used is compared with that where the acute blade angle dies of the conventional type are used, it will be made clear that the eccentricity of the latter is very small as compared with the former as illustrated in the Table I below.

TABLE I

| Type of shaving dies | Appearance of product | Eccentricity of core |
|---|---|---|
| Acute angle dies | Knot appeared | 0.05%. |
| $\sigma=90°$ dies | Small knots appeared | 0.02–0.03%. |
| $\sigma=120°$ dies | Good (without knot) | 0.02% or less. |

The requisite quantity of the cladding material in the final product of the present method is by far smaller than the quantity of the cladding material at the beginning. It is desirable that the cladding material is in as small a quantity as possible. For this purpose, it is necessary to increase the relative deformability of the core material and the cladding material. However, as the shape of the core should not be changed, it is better in practice to increase the deformability of the cladding material. The aforementioned type of pressure rollers 10 having guide holes or lip cavities 14, 14' on both sides is effective in promoting the flow of the cladding material, and the heating of the cladding material increases its deformability still further.

It has been found as a result of experiments that in case of an aluminum tape of the same dimensions of the core wire is used to form the outer coating and in case where aluminum is extruded to form the outer coating, bonding is effected in most parts if pressure bonding is made at a room temperature, but some parts are left unbonded and the steel wire becomes slightly deformed. However, if the aluminum is heated to 250° C., the steel core undergoes no deformation at all and the aluminum is bonded securely to the steel core wire. Further experiments have also shown that it is necessary to increase the thickness of the aluminum cladding material by 30% or more if the bonding of the cladding metal is to be made secure at a room temperature. In addition, the deformation of the steel core becomes more remarkable in this case, as shown in Table II below.

TABLE II

| | Experiment 1 | Experiment 2 | Experiment 3 |
|---|---|---|---|
| Thickness of formed aluminum (mm.) | 2.5 | 1.8 | 1.8 |
| Bonding temperature (° C.) | (1) | (1) | 250 |
| Finished wire diameter (mm.) | 3.5 | 3.5 | 3.5 |
| Tensile strength (kg./mm.²) | 137 | 153 | 153 |
| Elongation (percent) | 0.5 | 1.0 | 2.9 |
| Twist value (times) | 13 | 22 | 30 |

¹ Room temperature.

The above properties represent the results of comparison of those of good bonding. The difference in properties is due to the degrees of eccentricity and of true roundness of the core. According to the results of experiments, the degree of circularity of the core bonded in a heated condition was less than ±0.01 mm., and the variation in the thickness of the coating was less than ±0.05 mm., while no eccentricity of the core was observed.

It is not advisable to heat the core because it causes deterioration of properties and deformation of the core itself. In the method of the present invention, it is desirable to have the core at a lower temperature than the cladding material. For this purpose, there are two methods available, one in which forming is made with heated cladding material and is immediately subjected to pressure bonding, and the other in which, after the core is covered with the cladding material, only the cladding material is heated and pressure bonded. For industrial purposes, the latter is preferable because in the former method the cladding material gets extremely softened so that forming is difficult and pressure bonding impossible if heating is made before forming, whereas, in the latter method, the oxidation of the contact surface is prevented and good pressure is effected if the cladding material is heated after the covering is formed.

As a result of experiments concerning the relationship between the temperature of the core and the temperature of the cladding material, it has been proved, for example, that in the manufacture of aluminum cladded steel wire, it is necessary in order to obtain an excellent product to make the temperature of the aluminum 200°–300° C. and the temperature of steel core wire 0°–150° lower than that of the aluminum and at least lower than 250° C.

TABLE III

| | Heating temperature for pressure bonding | | Properties of finished wire | | |
|---|---|---|---|---|---|
| Heating conditions | Aluminum (° C.) | Steel wire (° C.) | Tensile strength (kg./mm.²) | Twisting (1,000 times) | Appearance |
| (1) Room temperature | (¹) | (¹) | 155 | 17 | Defects like corrugation form on Al surface taking place at the time of pressure bonding. |
| (2) Al within said temperature range. No temperature difference from steel. | 150 | 150 | 156 | 16 | Near to pressure bonding at room temp. |
| (3) Al within said temperature range. No temperature difference from steel. | 250 | 250 | 151 | 26 | |
| (4) Al within said temperature range. No temperature difference from steel. | 200 | 200 | 153 | 24 | |
| (5) Al within said temperature range. Temperature difference from steel within the said range. | 230 | 130 | 151 | 27 | |
| (6) Al above said temperature range. Temperature difference from steel exists. | 350 | 250 | | | Al abnormally deformed and pressure bonding impossible. |
| (7) Steel above said range, and has temperature difference from Al. | 250 | 300 | 164 | 13 | |

¹ Room temperature.

As is obvious from the above-mentioned results of experiments shown in Table III, it is necessary to make the temperature of the cladding material higher than that of the core to a degree within the specified range and carry out the pressure bonding while maintaing this temperature difference. In the method of forming the cover from a tape, when adopted in embodying the present invention, the contact surfaces of the inner and outer metals are particularly cleaned and roughened in the first process, so that the pressure bond between the two metallic surfaces may become exceedingly strong as a result of rough surface bonding. Where the method in which the cladding material is formed into a seamless pipe form by preheating the cladding material in the billet form and hot extruding it by an extrusion press is employed, an equally strong bond can be obtained by pressure bonding, the fresh clean surface of the cladding material created through an extreme extruding deformation and the clean and rough surface of the core material.

With regard to the process to shave off excessive material, a series of a requisite number of dies may be required, depending on the quantity of the excessive material, since the quantity scalped off by a single shaving die is limited. In shaving off excessive material, the application of a back tension to the wire rod is highly effective in making the operation easy and dependable. Where a plurality of dies are positioned continuously in a series, as in the case of the method of the present invention, the preceding dies give a back tension to the following dies, so that it requires only one travel of the composite wire $c$ through the rows of dies to complete the necessary shaving, it being made possible to make the shaving quantity of each die within desired limits and the vibration of the wire rod or core being prevented by the tension given between aligned dies to obtain a smoothly finished wire surface and prevent even a slight variation in the thickness of the clad coating.

Above is the description of an example of the embodiment of the invention where a steel core is cladded with copper or a steel core is cladded with aluminum. Besides a steel core, however, wires of iron, copper, nickel, their alloys, etc., which have a comparatively great resistance to deformation, may be used. Needless to say, the cladding metals should have a smaller resistance to deformation than the core material, such as, copper, aluminum, lead, nickel. These metals and their alloy tapes may be used for the cladding material.

What is claimed is:

1. The method of manufacturing a metallic composite wire comprising the steps of providing a core wire to be covered with an outer cladding material having an original form of a continuous tape with a smaller resistance to deformation than the core wire, continuously forming the cladding tape circumferentially around the core wire to produce a composite wire, progressively heating the composite wire, effecting a pressure bonding of the outer cladding tape to the core wire by passing the heated composite wire through a pair of calibered rollers forming together at their point of tangential proximity an elongated lip-shaped concavity approximating a diamond-shaped contour to receive the composite wire and to circumferentially work the heated cladding material to uniformly bond the same under pressure to the entire core wire surface, permitting excess cladding to laterally extrude into conjugate concavities, severing said excess cladding, and thereafter shaving off the compacted cladding edges of the calibered composite wire to effect a concentric circular composite wire.

2. The method of manufacturing a metallic composite wire of claim 1 characterized by passing the heated composite wire through a second pair of calibered rollers forming together at their point of tangential proximity an elongated lip-shaped concavity of less elongated extent as compared to the first such mentioned concavity to further circumferentially work to uniformly bond the heated cladding material to the entire core wire surface.

3. The method of manufacturing a metallic composite wire of claim 1 characterized by the step of selecting the desired elongated extent of the lip-shaped concavity upon determining the deformability characteristics of the cladding material.

4. The method of manufacturing a metallic composite wire of claim 1 wherein the excess cladding is simultaneously severed from the calibered composite wire upon being laterally extruded into the conjugate concavities.

5. The method of manufacturing metallic composite wire of claim 1 characterized by the step of shaving off the compacted cladding edges of the calibered composite wire by means of shear dies having an obtuse angled blade surface.

6. The method of manufacturing a metallic composite wire of claim 5 characterized by providing a series of shear dies, passing the calibered composite wire between the shear dies, each set of shear dies successively applying a back tension on the composite wire for the subsequently aligned shear die to successively scalp off a determined amount of the compacted cladding edges of the calibered composite wire to effect a concentric circular composite wire.

7. The method of manufacturing a metallic composite wire of claim 1 characterized by the step of grit blasting the circumferential surface of the core wire to clean and roughen the same prior to the step of cladding.

8. The method of manufacturing a metallic composite wire of claim 7 characterized by the additional step of roughening the interface surface of the cladding tape prior to the step of cladding.

9. The method of manufacturing a metallic composite wire of claim 7 characterized by the step of plating the surface of the core wire with a softer metallic material prior to the step of grit blasting.

10. The method of manufacturing a metallic composite wire of claim 1, the step of progressively heating the composite wire characterized in that a temperature difference within a requisite range is maintained between the wire core and the cladding tape.

References Cited

UNITED STATES PATENTS 3,167,857   2/1965   Saito _____ 29—474.1
3,220,106  11/1965   Clark _____ 29—470.1 X
3,220,107  11/1965   Clark _____ 29—474.1

JOHN F. CAMPBELL, *Primary Examiner.*

R. F. DROPKIN, *Assistant Examiner.*

U.S. Cl. X.R.

29—481, 488, 497.5, 498; 228—5, 13, 17, 44, 49